US009802120B2

(12) United States Patent
Hall

(10) Patent No.: US 9,802,120 B2
(45) Date of Patent: *Oct. 31, 2017

(54) GEOGRAPHIC ADVERTISING USING A SCALABLE WIRELESS GEOCAST PROTOCOL

(71) Applicant: AT&T Intellectual Property I, LP, Atlanta, GA (US)

(72) Inventor: Robert J Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/802,115

(22) Filed: Jul. 17, 2015

(65) Prior Publication Data
US 2015/0324852 A1 Nov. 12, 2015

Related U.S. Application Data

(63) Continuation of application No. 12/641,054, filed on Dec. 17, 2009, now Pat. No. 9,118,428.
(Continued)

(51) Int. Cl.
*H04H 20/71* (2008.01)
*A63F 13/31* (2014.01)
(Continued)

(52) U.S. Cl.
CPC .............. *A63F 13/31* (2014.09); *A63F 13/10* (2013.01); *A63F 13/12* (2013.01); *A63F 13/211* (2014.09);
(Continued)

(58) Field of Classification Search
CPC ....... H04W 4/02; H04W 64/00; H04W 4/021; H04L 12/1845
(Continued)

(56) References Cited

U.S. PATENT DOCUMENTS 3,833,221 A 9/1974 Van Tol
5,483,667 A 1/1996 Faruque et al.
(Continued)

FOREIGN PATENT DOCUMENTS

WO WO 2007/016641 A2 2/2007

OTHER PUBLICATIONS

"Boost Mobile Introduces First Location-based, GPS games in US" http://www.physorg.com/news5824.html, Aug. 16, 2005.
(Continued)

*Primary Examiner* — Chi H Pham
*Assistant Examiner* — Alexander O Boakye
(74) *Attorney, Agent, or Firm* — Baker & Hostetler LLP

(57) ABSTRACT

Geographic advertising utilizes a location of a mobile communications device to infer potential interest in a product and/or service. A scalable network protocol is utilized to provide advertisements, coupons, discounts, or the like, to mobile communications devices that are within a select geographic area or areas. A geographically addressed message is formulated based on the location of a potential customer and the content to be provided to potential customer. A message is generated at the time it is sent based on a current location of mobile communications device in the select geographic area. A protocol is utilized that replaces an IP address with a geographic location.

20 Claims, 12 Drawing Sheets

Related U.S. Application Data

(60) Provisional application No. 61/258,167, filed on Nov. 4, 2009.

(51) Int. Cl.
| | |
|---|---|
| *G06Q 30/02* | (2012.01) |
| *H04W 4/00* | (2009.01) |
| *A63F 13/216* | (2014.01) |
| *A63F 13/40* | (2014.01) |
| *A63F 13/30* | (2014.01) |
| *H04L 12/18* | (2006.01) |
| *H04W 4/02* | (2009.01) |
| *H04W 4/04* | (2009.01) |
| *H04H 20/59* | (2008.01) |
| *H04W 4/22* | (2009.01) |
| *A63F 13/211* | (2014.01) |
| *A63F 13/812* | (2014.01) |
| *A63F 13/95* | (2014.01) |
| *H04W 84/18* | (2009.01) |

(52) U.S. Cl.
CPC ............ *A63F 13/216* (2014.09); *A63F 13/40* (2014.09); *A63F 13/812* (2014.09); *A63F 13/95* (2014.09); *G06Q 30/0261* (2013.01); *H04H 20/59* (2013.01); *H04L 12/1845* (2013.01); *H04W 4/001* (2013.01); *H04W 4/008* (2013.01); *H04W 4/02* (2013.01); *H04W 4/04* (2013.01); *H04W 4/22* (2013.01); *A63F 2300/1093* (2013.01); *A63F 2300/406* (2013.01); *A63F 2300/66* (2013.01); *A63F 2300/69* (2013.01); *H04L 12/189* (2013.01); *H04W 4/021* (2013.01); *H04W 4/027* (2013.01); *H04W 4/028* (2013.01); *H04W 84/18* (2013.01)

(58) Field of Classification Search
USPC ......................................................... 370/312
See application file for complete search history.

(56) References Cited

U.S. PATENT DOCUMENTS

| | | | |
|---|---|---|---|
| 5,930,716 | A | 7/1999 | Sonetaka |
| 6,006,328 | A | 12/1999 | Drake |
| 6,015,344 | A | 1/2000 | Kelly et al. |
| 6,069,885 | A | 5/2000 | Fong et al. |
| 6,119,976 | A | 9/2000 | Rogers |
| 6,195,751 | B1 | 2/2001 | Caronni et al. |
| 6,304,556 | B1 | 10/2001 | Haas |
| 6,360,107 | B1 | 3/2002 | Lin et al. |
| 6,428,470 | B1 | 8/2002 | Thompson |
| 6,516,199 | B1 | 2/2003 | Soederkvist et al. |
| 6,628,620 | B1 | 9/2003 | Cain |
| 6,781,971 | B1 | 8/2004 | Davis et al. |
| 6,807,165 | B2 | 10/2004 | Belcea |
| 6,816,460 | B1 | 11/2004 | Ahmed et al. |
| 6,870,846 | B2 | 3/2005 | Cain |
| 6,873,613 | B1 | 3/2005 | Dent |
| 6,879,574 | B2 | 4/2005 | Naghian et al. |
| 6,909,706 | B2 | 6/2005 | Wilmer et al. |
| 6,937,602 | B2 | 8/2005 | Whitehill et al. |
| 6,940,832 | B2 | 9/2005 | Saadawi et al. |
| 6,954,435 | B2 | 10/2005 | Billhartz et al. |
| 6,958,986 | B2 | 10/2005 | Cain |
| 7,027,822 | B1 | 4/2006 | Hwang et al. |
| 7,152,110 | B2 | 12/2006 | Pierce |
| 7,179,166 | B1 | 2/2007 | Abbott |
| 7,197,326 | B2 | 3/2007 | Acampora |
| 7,295,521 | B2 | 11/2007 | Choi et al. |
| 7,307,978 | B2 | 12/2007 | Carlson |
| 7,435,179 | B1 | 10/2008 | Ford |
| 7,525,933 | B1 | 4/2009 | Hall |
| 7,540,028 | B2 | 5/2009 | Ahmed et al. |
| 7,573,858 | B2 | 8/2009 | Roh et al. |
| 7,613,467 | B2 | 11/2009 | Fleischman |
| 7,669,052 | B2 | 2/2010 | Asano et al. |
| 7,808,960 | B1 | 10/2010 | Chan et al. |
| 7,813,326 | B1 | 10/2010 | Kelm et al. |
| 7,864,168 | B2 | 1/2011 | French |
| 7,917,169 | B1 | 3/2011 | Hall |
| 7,957,390 | B2 | 6/2011 | Furlong et al. |
| 7,969,914 | B1 | 6/2011 | Gerber |
| 7,970,749 | B2 | 6/2011 | Uhlir et al. |
| 8,001,189 | B2 | 8/2011 | Nielson et al. |
| 8,073,327 | B2 | 12/2011 | Mayer |
| 8,074,275 | B2 | 12/2011 | Ramaiah et al. |
| 8,128,405 | B2 | 3/2012 | Preston et al. |
| 8,149,801 | B2 * | 4/2012 | Hall ................. H04W 4/021 370/338 |
| 8,218,463 | B2 | 7/2012 | Hall |
| 8,248,367 | B1 | 8/2012 | Barney et al. |
| 8,332,544 | B1 | 12/2012 | Ralls et al. |
| 8,341,271 | B2 | 12/2012 | Cho et al. |
| 8,355,410 | B2 | 1/2013 | Hall |
| 8,359,643 | B2 | 1/2013 | Low et al. |
| 8,376,857 | B1 | 2/2013 | Shuman et al. |
| 8,483,652 | B2 | 7/2013 | Hall |
| 8,702,506 | B2 | 4/2014 | Hall |
| 9,036,509 | B1 | 5/2015 | Addepalli et al. |
| 9,118,428 | B2 * | 8/2015 | Hall ................. A63F 13/10 |
| 9,161,158 | B2 | 10/2015 | Hall |
| 9,319,842 | B2 | 4/2016 | Hall |
| 2001/0014094 | A1 | 8/2001 | Epley |
| 2002/0085582 | A1 | 7/2002 | Kim |
| 2002/0113872 | A1 | 8/2002 | Kinjo |
| 2002/0141454 | A1 | 10/2002 | Muniere |
| 2002/0155846 | A1 | 10/2002 | Shiraga |
| 2002/0163912 | A1 | 11/2002 | Carlson |
| 2002/0167960 | A1 | 11/2002 | Garcia-Luna-Aceves |
| 2002/0169971 | A1 | 11/2002 | Asano et al. |
| 2003/0074413 | A1 | 4/2003 | Nielsen et al. |
| 2003/0105956 | A1 | 6/2003 | Ishiguro et al. |
| 2003/0153373 | A1 | 8/2003 | Squibbs |
| 2003/0174690 | A1 | 9/2003 | Benveniste |
| 2003/0187570 | A1 | 10/2003 | Impson et al. |
| 2003/0193394 | A1 | 10/2003 | Lamb |
| 2003/0235158 | A1 | 12/2003 | Lee |
| 2004/0013062 | A1 | 1/2004 | Hino et al. |
| 2004/0032847 | A1 | 2/2004 | Cain |
| 2004/0083385 | A1 | 4/2004 | Ahmed et al. |
| 2004/0121792 | A1 | 6/2004 | Allen et al. |
| 2004/0151144 | A1 | 8/2004 | Benveniste |
| 2004/0185881 | A1 | 9/2004 | Lee et al. |
| 2004/0213270 | A1 | 10/2004 | Su et al. |
| 2004/0259563 | A1 | 12/2004 | Morton et al. |
| 2004/0264461 | A1 | 12/2004 | Janneteau et al. |
| 2005/0036448 | A1 | 2/2005 | Leeuwen |
| 2005/0039040 | A1 | 2/2005 | Ransom et al. |
| 2005/0058151 | A1 | 3/2005 | Yeh |
| 2005/0086350 | A1 | 4/2005 | Mai |
| 2005/0096065 | A1 | 5/2005 | Fleischman |
| 2005/0129051 | A1 | 6/2005 | Zhu et al. |
| 2005/0152318 | A1 | 7/2005 | Elbatt et al. |
| 2005/0152378 | A1 | 7/2005 | Bango et al. |
| 2005/0208949 | A1 | 9/2005 | Chiueh et al. |
| 2005/0243788 | A1 | 11/2005 | Janczak |
| 2005/0254453 | A1 | 11/2005 | Barneah |
| 2005/0259597 | A1 | 11/2005 | Benedetto |
| 2005/0271057 | A1 | 12/2005 | Kim et al. |
| 2006/0013154 | A1 | 1/2006 | Choi et al. |
| 2006/0023677 | A1 | 2/2006 | Labrador |
| 2006/0084444 | A1 | 4/2006 | Kossi et al. |
| 2006/0126535 | A1 | 6/2006 | Sherman |
| 2006/0128349 | A1 | 6/2006 | Yoon |
| 2006/0148516 | A1 | 7/2006 | Reddy et al. |
| 2006/0153157 | A1 | 7/2006 | Roh et al. |
| 2006/0165015 | A1 | 7/2006 | Melick et al. |
| 2006/0227787 | A1 | 10/2006 | Furlong et al. |
| 2007/0008925 | A1 | 1/2007 | Dravida et al. |
| 2007/0019591 | A1 | 1/2007 | Chou et al. |

(56) References Cited

U.S. PATENT DOCUMENTS

| | | |
|---|---|---|
| 2007/0019594 A1 | 1/2007 | Perumal et al. |
| 2007/0104096 A1 | 5/2007 | Ribera |
| 2007/0110092 A1 | 5/2007 | Kangude et al. |
| 2007/0124395 A1 | 5/2007 | Edge et al. |
| 2007/0180533 A1 | 8/2007 | Ramaiah et al. |
| 2007/0198731 A1 | 8/2007 | Li et al. |
| 2007/0217346 A1 | 9/2007 | Zheng |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0265089 A1 | 11/2007 | Robarts et al. |
| 2007/0266396 A1 | 11/2007 | Estermann |
| 2007/0283001 A1 | 12/2007 | Spiess et al. |
| 2007/0287437 A1 | 12/2007 | Cartmell |
| 2008/0015024 A1 | 1/2008 | Mullen |
| 2008/0039113 A1 | 2/2008 | Liu et al. |
| 2008/0058099 A1 | 3/2008 | Schwartz et al. |
| 2008/0076569 A1 | 3/2008 | Tabata |
| 2008/0080401 A1 | 4/2008 | Ribiere |
| 2008/0095134 A1 | 4/2008 | Chen et al. |
| 2008/0095163 A1 | 4/2008 | Chen et al. |
| 2008/0137624 A1 | 6/2008 | Silverstrim et al. |
| 2008/0144493 A1 | 6/2008 | Yeh |
| 2008/0145050 A1 | 6/2008 | Mayer et al. |
| 2008/0147854 A1 | 6/2008 | Van Datta et al. |
| 2008/0159236 A1 | 7/2008 | Ch'ng |
| 2008/0163355 A1 | 7/2008 | Chu |
| 2008/0186206 A1 | 8/2008 | Reumerman |
| 2008/0192737 A1 | 8/2008 | Miyazaki |
| 2008/0262928 A1 | 10/2008 | Michaelis |
| 2009/0005140 A1 | 1/2009 | Rose et al. |
| 2009/0017913 A1 | 1/2009 | Bell et al. |
| 2009/0030605 A1 | 1/2009 | Breed |
| 2009/0033034 A1 | 2/2009 | Jakubowski |
| 2009/0041039 A1 | 2/2009 | Bear |
| 2009/0045977 A1 | 2/2009 | Bai et al. |
| 2009/0046628 A1 | 2/2009 | Hall |
| 2009/0073912 A1 | 3/2009 | Bauchot et al. |
| 2009/0122753 A1 | 5/2009 | Hughes et al. |
| 2009/0138353 A1 | 5/2009 | Mendelson |
| 2009/0175223 A1 | 7/2009 | Hall |
| 2009/0195401 A1 | 8/2009 | Maroney et al. |
| 2009/0201860 A1 | 8/2009 | Sherman et al. |
| 2009/0207783 A1 | 8/2009 | Choi et al. |
| 2009/0245518 A1 | 10/2009 | Bae et al. |
| 2009/0248420 A1 | 10/2009 | Basir |
| 2009/0274093 A1 | 11/2009 | Senouci et al. |
| 2009/0292926 A1 | 11/2009 | Daskalopoulos et al. |
| 2009/0298461 A1 | 12/2009 | O'Reilly |
| 2009/0323579 A1 | 12/2009 | Bai et al. |
| 2009/0325603 A1 | 12/2009 | Van Os et al. |
| 2010/0008259 A1 | 1/2010 | Yoon et al. |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0128653 A1 | 5/2010 | Tateson |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0214987 A1 | 8/2010 | Mori |
| 2010/0215040 A1 | 8/2010 | Kappler et al. |
| 2010/0226342 A1 | 9/2010 | Coiling et al. |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0253547 A1 | 10/2010 | Tenetylo |
| 2010/0279776 A1 | 11/2010 | Hall |
| 2010/0287011 A1 | 11/2010 | Muchkaev |
| 2010/0304759 A1 | 12/2010 | Leppanen et al. |
| 2010/0329463 A1 | 12/2010 | Ratliff et al. |
| 2011/0002243 A1 | 1/2011 | Sherman et al. |
| 2011/0016225 A1 | 1/2011 | Park et al. |
| 2011/0063116 A1 | 3/2011 | Lepley et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2011/0164546 A1 | 7/2011 | Mishra et al. |
| 2011/0177829 A1 | 7/2011 | Platt et al. |
| 2011/0191425 A1 | 8/2011 | Brodeur et al. |
| 2011/0201369 A1 | 8/2011 | Kim et al. |
| 2011/0230202 A1 | 9/2011 | Wood et al. |
| 2011/0244887 A1 | 10/2011 | Dupray et al. |
| 2011/0299685 A1 | 12/2011 | Hall |
| 2012/0023550 A1 | 1/2012 | Xu et al. |
| 2012/0058814 A1 | 3/2012 | Lutnick et al. |
| 2012/0079080 A1 | 3/2012 | Pishevar |
| 2012/0084364 A1 | 4/2012 | Sivavakeesar |
| 2012/0094770 A1 | 4/2012 | Hall |
| 2012/0108326 A1 | 5/2012 | Hall |
| 2012/0128010 A1 | 5/2012 | Huang et al. |
| 2012/0157210 A1 | 6/2012 | Hall |
| 2012/0329538 A1 | 12/2012 | Hall |
| 2013/0099941 A1 | 4/2013 | Jana et al. |
| 2013/0099976 A1 | 4/2013 | Cornwall et al. |
| 2014/0082369 A1 | 3/2014 | Waclawsky et al. |
| 2014/0100027 A1 | 4/2014 | Harris et al. |
| 2014/0161006 A1 | 6/2014 | Hall |
| 2014/0335952 A1 | 11/2014 | Hall |

OTHER PUBLICATIONS

Location Enabled Mobile Gaming; http:/www.nn4d.com/site/global/market/affiliatesites/lbsglobe/lbsappiications/mobilegaming.jsp, 2007.

"Sony bigwig hints at GPS-enabled PSP games"; http:www.vespacious.com/sony-bigwighints-at-gps-enabled-psp-games.hmtl, Dec. 22, 2008.

Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.

Balasubramaniam, et al. "Interactive WiFi Connectivity for Moving Vehicles," Proceedings of SIGCOMM, Aug. 17-22, 2008, 12 pages.

Bjerver, Martin, "Player Behaviour in Pervasive Games—using the City as a Game Board in Botfighters", Master of Science Thesis, KTH Computer Science and Communication, Stockholm, Sweden, 2006.

bzflag(6):tank battle game—linux man page, Google date Feb. 1, 2001, downloaded from httQ://linux.die.net/man/6/bzflag.

Conti, "Body Personal, and Local Ad Hoc Wireless Networks", Chapter 1, CRC Press, 2003, 22 pages.

Corbett, et al. "A Partitioned Power and Location Aware MAC Protocol for Mobile Ad Hoc Networks," Technical Report No. 553, University of Sydney, School of Information Technologies, Jul. 2004, 7 pages.

Das, et al., "SPAWN: A Swarming Protocol for Vehicular Ad-Hoc Wireless Networks,"Proceedings of 1st ACM Vanet, Oct. 2004, 2 pages.

de Souza e Silva, Adriana, "Alien revolt (2005-2007): A case study of the first locationbased mobile game in Brazil", IEEE Technology and Society Magazine, Spring 2008, pp. 18-28.

Dialogic, "Adding location based services to existing architectures", Application Note: Location-Based Services, 9862-02, Oct. 2007, 14 pages, downloaded from http://www.dialog ic.com/-/med ia/prod u cts/docs/sig naling-and-ss 7 components/9862_Add_Locationbased_Servs_an.pdf.

Eriksson, et al., "Cabernet: Vehicular Content Delivery Using WiFi," Proceedings of Mobicom, Sep. 2008, 12 pages.

(56) References Cited

OTHER PUBLICATIONS

Gallagher, Sean, "Army prepares test of new wireless war game gear", Defense Systems, Jul. 7, 2008, downloaded from http://defensesystems.com/articles/2008/07/army-preparetest-of-new-wireless-war-game-gear.aspx.

German Aerospace Center, Simulation of Urban Mobility, 2010, http://sumo.sourceforge.net, 1page.

Gupta, et al., "The Capacity of Wireless Networks," IEEE Transactions on Information Theory, 46(2), Mar. 2000, 17 pages.

Hadaller, et al., "Vehicular Opportunistic Communication Under the Microscope, "Proceedings of MobiSys, Jun. 11-14, 2007, 206-219.

Halas, Jacek, "Ghost Recon: Advanced Warfighter Game Guide, [Mission 01] Contact—Objective: Locate Ramirez with the Drone", 2007, downloaded from http://guides.gamepressure.com/ghostreconadvancedwarfighter/guide.asp?ID=986.

Hall et al., "A Two-Level Quality of Service Scheme for Collision based on Mobile Ad Hoc Networks", IEEE, 1-4244-1513-06/07, 2007, 8 pages.

Hall, "An Improved Geocast for Mobile Ad Hoc Networking," IEEE Transactions on Mobile Computing, 2010, 1-14.

Hall, An Improved Geocast for Mobile Ad Hoc Networks, IEEE Transactions on Mobile Computing, Feb. 2011, pp. 254-266, vol. 10, No. 2.

Hall, "Cheating Attacks and Resistance Techniques in Geogame Design," Proc. 2010 ACM FuturePlay Symposium, 2010, 82-89.

Hall, "Combinatorial Communications Modeling of Real-Time Engagement Adjudication Architectures", 2005 IEEE Military Communications Conference, Oct. 2005, vol. 3, 1488-1494.

Hall, "RTEQ: Modeling and Validating Infinite-State Hard-Real-Time Systems", AT&T Labs Research, ASE 2007, Nov. 2007, 4 pages.

Hall, et al., "A Tiered Geocast Protocol for Long Range Mobile Ad Hoc Networking, "Proceedings of the 2006 IEEE Military Communications Conf., 2006, 8 pages.

Harris, RF-6920 C2CE-CNR Situational Awareness Application Brochure, downloaded from http:/ /rf. harris.com/media/R F-6920 tcm26-9172.pdf, Nov. 2008, 2 pages.

Heissenbuttel, et al., "BLR: Beacon-Less Routing Algorithm for Mobile Ad-Hoc Networks," Elsevier's Computer Communications Journal, 27, 2003, 15 pages.

Hohfeld, Alexander, "In and out of reality: Janus-faced location awareness in ubiquitous games", Journal of Software, 2(6), Dec. 2007, 86-92.

http://askville .amazon .com/Wii-games-play-internetFamily/ AnswerViewer.do?requestId=6796582, 2007.

Hull, et al., "CarTel: A Distributed Mobile Sensor Computing System," Proceedings of ACM SenSys, Nov. 2006, 14 pages.

International Patent Application No. PCT/US2012/038079: International Search report and Written Opinion dated Oct. 17, 2012, WIPO, 12 pages.

Kaplan, et al., "The Analysis of a Generic Air-to-Air Missile Simulation Model", NASA Technical Memorandum 109057, Jun. 1994, 48 pages.

Karp, et al., "GPSR: Greedy Perimeter Stateless Routing for Wireless Networks," Proceedings of Mobicom, 2000, ACM 2000, 12 pages.

Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.

Ko et al., "Geocasting in Mobile Ad Hoc Networks: Location-based Multicast Algorithms", Technical Report TR-98-018 Texas A&M University, Sep. 1998, 1-6.

Ko, et al., "Flooding-Based Geocasting Protocols for Mobile Ad Hoc Networks," Mobile Networks and Applications, Dec. 2002, 7, 471-480.

Kuhn, et al., "Geometric Ad-Hoc Routing: of Theory and Practice," Proc. 2003 Symposium on Principles of Distributed Computing, ACM 2003, 10 pages.

Lee, et al., "CarTorrent: A Bit-Torrent System for Vehicular Ad-Hoc Networks," Mobile Networking for Vehicular Environments, Sep. 2007, 6 pages.

Lee, et al., "Efficient Geographic Routing in Multihop Wireless Networks," Proc. MobiHoc 2005, ACM, 2005, 12 pages.

Liao et al., "GRID: A Fully Location-Aware Routing Protocol for Mobile Ad Hoc Networks", Telecommunication Systems, 2001, 18, pp. 1-26.

Lindo, Wayne A. et al., "Network modeling and simulation in the OneTESS program", Fall Simulation Interoperability Workshop 2006, Orlando, Florida, USA, Sep. 10-15, 2006, 155ff.

Maihofer, "A Survey of Geocast Routing Protocols," IEEE Communications Surveys, Jun. 2004, vol. 6, No. 2 32-.

Manvi, et al., "Performance Analysis of AODV, DSR, and Swarm Intelligence Routing Protocols in Vehicular Ad Hoc Network Environment," Proceedings of IEEE Future Computer and Communications, Apr. 2009.

MyCheats web page, "Ghost Recon: Advanced Warfighter Superguide, Reach Ramirez", (Jul. 19, 2006), downloaded from http:/ /mycheats.1up.com/view/section/3139558/18404/ghost_ recon_advanced_warfighter/pc.

Ni, et al., "The Broadcast Storm Problem in a Mobile Ad Hoc Network," Proceedings of the 5th Annual ACM/IEEE International Conference on Mobile Computing and Networking, ACM, 1999, 151-162.

Nicklas et al., "On building location aware applications using an open platform based on the NEXUS Augmented World Model," Software and Systems Modeling, Dec. 2004, 3(4), 303-313.

Niculescu, et al., "Trajectory Based Forwarding and Its Applications," Proc. Mobicom 2003, ACM, 2003, 13 pages.

Nintendo, The computer game "Mario Kart OS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.

NS-2, "The Network Simulator," 2010, http:i/isi.edu/nsnarn/ns, 2 pages.

Panta, "GeoV2V: Vehicular Communications Using a Scalable Ad Hoc Geocast Protocol," AT&T Labs Research, 14 pages. (no date available).

Santos, Nuno et al., "Vector-field consistency for ad-hoc gaming", Middleware 2007, LNCS 4834, 2007, pp. 80-100.

Schutzberg, "Phone-based GPS-based Games: Missing Pieces"; http://www.directionsmaq.com/articlephp?article id=939 Aug. 17, 2005.

Schwingenschlogl, "Geocast Enhancements of AODV for Vehicular Networks," ACM SIGMOBILE Mobile Computing and Communications Review, Jun. 2002, 18 pages.

Seada, Efficient and Robust Geocasting Protocols for Sensor Networks, Computer Communications, Elsevier, 2006, vol. 29, 151-161.

Shevade, et al., "Enabling High-Bandwidth Vehicular Content Distribution," Proceedings of CoN EXT 2010, Nov. 30-Dec. 3, 2010, 12 pages.

Shih et al., A Distributed Slots Reservation Protocol for QoS Routing on TDMA-based Mobile Ad Hoc Networks, 2004, (ICON 2004), Proceedings, 12 IEEE International Conference, Nov. 2004, 2, 660-664.

Shih et al., "CAPC: A Collision Avoidance Power Control MAC Protocol for Wireless Ad Hoc Networks", IEEE Communications Letters, Sep. 2005, 9(9), 859-861.

Social +Gaming—SWiK: http://swik.net/social+ gaming, 2009.

Sotamaa, Olli, "All the world's a Botfighter Stage: Notes on location-based multi-user gaming", Proceedings of Computer Games and Digital Cultures Conference, Tampere University Press, 2002, pp. 35-44.

STEVE: "GPS-enabled Cell Phone Games" http://www.strangenewproducts.com/2005/08/gps--enabled-cell-ghone-_games.html , Aug. 15, 2005.

Trivette, Sensor integration for the One Tactical Engagement Simulation System (One TESS), downloaded from http://vault.swri .org/cms/papers/3793 Presentation_2005 SensorsGov OneTESS.pdf, 2005, 28 pgs.

(56) References Cited

OTHER PUBLICATIONS

Tseng et al., "Fully Power-Aware and Location-Aware Protocols for Wireless Multi-hop Ad Hoc Networks", Proc. of IEEE Inti. Conference on Computer Communications and Networks (ICCCn), 2002, 6 pages.
Various Authors, The Wikipedia page for the "snake" computer game, Nov. 3, 2008 version, Wikipedia.com, downloaded by the USPTO from http://en.wikiQedia.org/w/index.php?title=Snake (video game)&oldid=249370716 on Oct. 4, 2012.
Winkler, Additional date evidence for the Ars Electronica organization archive document http:/ /archive.aec.at/submission/2004/U 19/1 043/, retrieved from http://web.archive.org/web/20050508084628/http://www.aec.aUen/archives/prix_archive/prixproject.asp? iProjectiD=12899, 2005, 1 page.
Winkler, The computer game "GPS::Tron", as evidenced by the Ars Electronica organization archive document http://archive.aec.aUsubmission/2004/U 19/1043/, where the document has an earliest archive.org verified publication date May 4, 2005, pp. 1-2.
Yassein, et al., "Performance Analysis of Adjusted Probabilistic Broadcasting in Mobile Ad Hoc Networks," Proc. 111 Inti. Conf. on Parallel and Distributed Systems Workshops, 2005, 27 pages.
Zahn, et al., "Feasibility of Content Dissemination Between Devices in Moving Vehicles, "Proceedings of CoNEXT 2009, Dec. 1-4, 2009, 11 pages.
Zorzi, et al., "Geographic Random Forwarding (GeRaF) for Ad Hoc and Sensor Networks: Multihop Performance," IEEE Transactions on Mobile Computing, Dec. 2003, 11 pages.
U.S. Appl. No. 11/264,834, filed Nov. 1, 2005, Hall.
U.S. Appl. No. 12/793,460, filed Jun. 3, 2010, Hall.
U.S. Appl. No. 12/837,168, filed Jul. 15, 2010, Hall.
U.S. Appl. No. 12/914,886, filed Oct. 28, 2010, Hall.
U.S. Appl. No. 12/969,386, filed Dec. 15, 2010, Hall.
U.S. Appl. No. 13/169,829, filed Jun. 27, 2011, Hall.
U.S. Appl. No. 13/169,892, filed Jun. 27, 2011, Hall.
U.S. Appl. No. 13/277,895, filed Oct. 20, 2011, Hall.
U.S. Appl. No. 13/327,472, filed Dec. 15, 2011, Hall.
U.S. Appl. No. 13/333,084, filed Dec. 21, 2011, Hall.
U.S. Appl. No. 13/683,025, filed Nov. 21, 2012, Panta.
U.S. Appl. No. 13/712,353, filed Dec. 12, 2012, Hall.
U.S. Appl. No. 13/875,735, filed May 2, 2013, Hall.
U.S. Appl. No. 13/890,423, filed May 9, 2013, Hall.
U.S. Appl. No. 14/279,441, filed May 16, 2014, Hall.

* cited by examiner

GEOGRAPHIC ADVERTISING USING A SCALABLE WIRELESS GEOCAST PROTOCOL

CROSS REFERENCE TO RELATED APPLICATIONS

This application is a continuation of U.S. patent application Ser. No. 12/641,054, filed on Dec. 17, 2009, now U.S. Pat. No. 9,118,428, issued, Aug. 25, 2015, which claims the benefit of U.S. Provisional Patent Application No. 61/258,167 filed on Nov. 4, 2009, each of which is incorporated herein by reference in its entirety.

BACKGROUND

Advertising techniques typically attempt to target a demographic presumed to be interested in an advertised product. For example, a television commercial for farming products may be broadcast in rural areas, and would not be broadcast in urban areas. A radio station known to play classic rock songs may advertise upcoming rock concerts. And, a talk radio station dedicated to financial reporting may advertise the services of financial advisors. This type of advertising, however, tends to be broad in nature and may provide advertisements to those who are not interested in the advertised product. Further, this type of advertising may miss those who are interested in the product.

SUMMARY

Geographic advertising utilizes a location of a mobile communications device to infer potential interest in a product and/or service. In an example embodiment, a scalable network protocol is utilized to provide advertisements, coupons, discounts, or the like, to mobile communications devices that are within a select geographic area or areas. In this example embodiment, a geographically addressed message is formulated based on the location of a potential customer and the content to be provided to potential customer. A message is generated at the time it is sent based on a current location of mobile communications device in the select geographic area. This geographic advertising does not require a recipient to be a subscriber, does not require cellular network access, and is scalable to any number of mobile communications devices.

DETAILED DESCRIPTION OF ILLUSTRATIVE EMBODIMENTS

Figure 1:
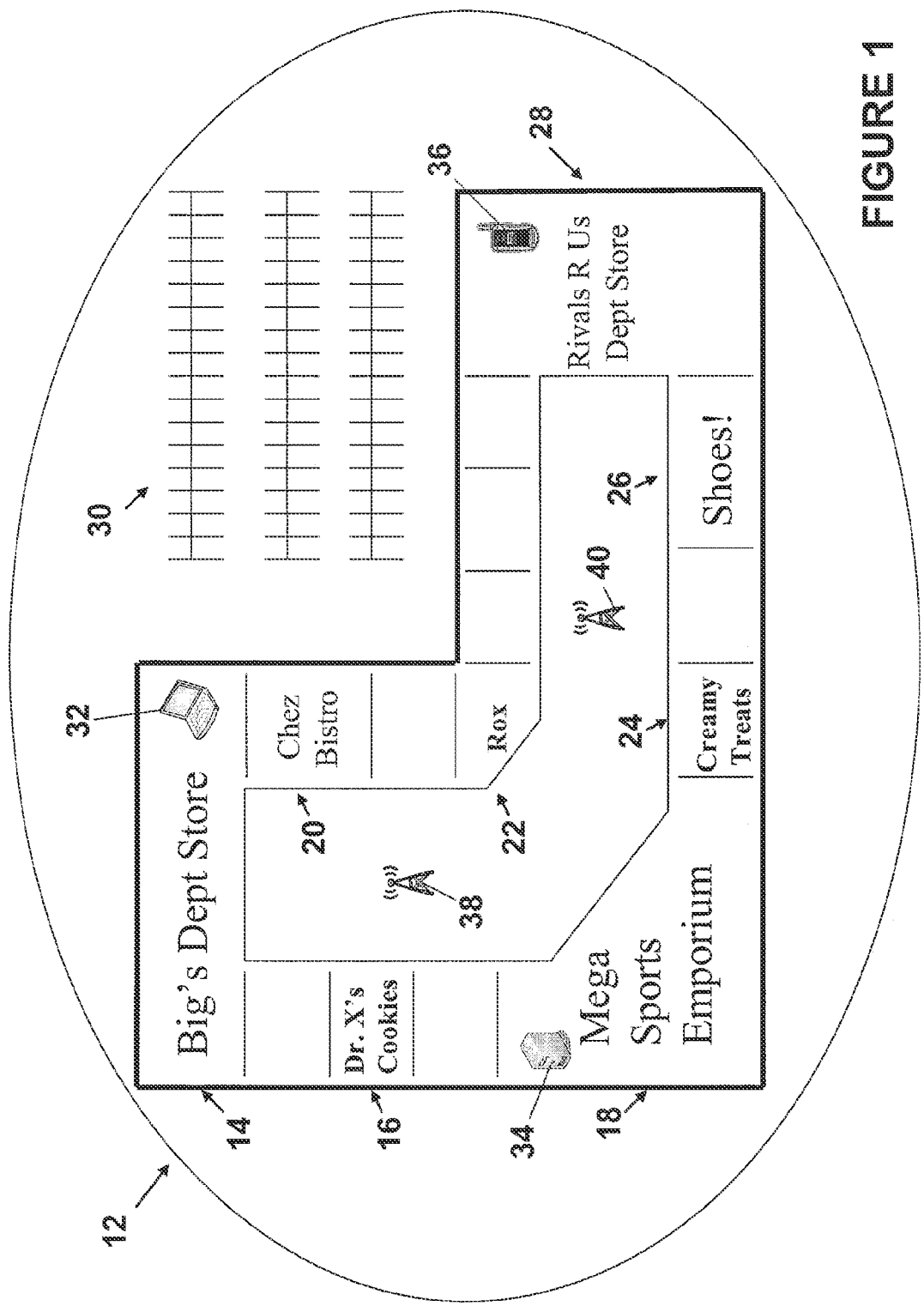
FIG. 1 is an example depiction of geographic advertising using a scalable wireless geocast protocol in a shopping mall.

Advertisements, coupons, discounts, or the like, are provided to a communications device based on the location of the communications device and the environment of the geographic area associated with the communications device. For example, if a communications device is located near a shoe store, an advertisement for shoes may be sent to the communications device. Or, in a shopping mall for example, as a communications device enters a geographic area associated with a particular store or restaurant, the communications device can receive an advertisement, coupon, sales list, menu, or the like, for the particular store/restaurant.

Advertisements are provided to mobile communications devices in a geographic region via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and incorporated by reference herein in its entirety. Geocasting uses a protocol in which an IP address is replaced with a geographic address. Generally, a packet is sent to every communications device located within a specific geographic region. The packet can contain an indication of the location of the sender, an indication of the geographic region, an advertisement, a coupon, a discount, a combination thereof, or the like. The communications devices in the geographic region, and any other communications devices that can communicate with them, are referred to, collectively, as a geocast ad hoc network. No registration is required to become a member of the geocast ad hoc network. Any communications device in the geocast ad hoc network can send a message to any or every communications device in the geocast ad hoc network. As communications devices move within communications range of any member of the geocast ad hoc network, they can become members of the geocast ad hoc network without requiring registration. The communications devices of the ad hoc network of communications devices communicate with each other. The ad hoc network of communications devices does not require base station terminals to control communications between the mobile devices. In example embodiments, base stations or routers may be used to relay messages between different geocast ad hoc networks, or to use other network transports such as other traditional internet protocol networks, such as the internet, to bridge messages between geocast ad hoc networks. Each communications device is capable of receiving and/or transmitting data packets to and/or from other communications devices in the ad hock network of communications devices.

In an example embodiment, a communications device transfers packets to other communications devices according to heuristic decision rules that determine whether a receiving device will re-transmit a received packet. These rules effectively guide packets to their destinations and control communication traffic within the ad hoc network. The decision rules achieve this control by using statistics obtained and recorded by a communications device as it receives packets transmitted within reception range within its environment. This distributed packet transfer mechanism results in packets "flowing" to and throughout the geocast region specified in each packet. The communications devices in the geocast region receive and process each distinct packet, typically rendering the content to the user via a user interface of a communications device. Two packets are distinct if they contain distinct geocast identifiers. However, a re-transmitted copy of a packet generally will contain the same geocast identifier as the original packet.

FIG. 1 depicts geographic advertising using a scalable wireless geocast protocol in a shopping mall. The shopping mall includes Big's Department Store 14, DR. X's cookies 16, Mega Sports Emporium 18, Chez Bistro 20, Rox jewelry store 22, Creamy Treats 24, Shoes! shoe store 26, Rivals R Us Department Store 28, and parking lot 30. In the example scenario depicted in FIG. 1, Big's Department Store 14, DR. X's cookies 16, Mega Sports Emporium 18, Chez Bistro 20, Rox jewelry store 22, Creamy Treats 24, Shoes! shoe store 26, and Rivals R Us Department Store 28, are locations in which communications devices of the geocast ad hoc network may be located. These locations can be configured with a transmitter/receiver (e.g., communications devices) for communication with other members of the geocast ad hoc network. Each or any combination of, Big's Department Store 14, DR. X's cookies 16, Mega Sports Emporium 18, Chez Bistro 20, Rox jewelry store 22, Creamy Treats 24, Shoes! shoe store 26, and Rivals R Us Department Store 28 can have a communications device configured to communicate with customers, via their respective communications devices. Example communications devices 32, 34, 36, and 42 are depicted for Big's Department Store 14, Mega Sports Emporium 18, Rivals R Us Department Store 28, and Rox 22, respectively. Only communications devices 32, 34, 36, and 42 are shown in FIG. 1 for the sake of simplicity. Additionally and/or alternatively, communications devices (e.g., communications devices 38, 40, possibly provided by the shopping mall in the form of WiFi transceivers for example), can be shared by locations in the shopping mall.

Geocast regions can be defined to cover any appropriate region. For example, as shown in FIG. 1, geocast region 12 covers the entire shopping mall and parking lot 30. Thus, mall management, for example, could send an advertisement to the geocast region 12. Such an advertisement, for example, could state "Looking for the perfect holiday gift? Get a mall gift card at the pavilion on the first floor."

It is to be understood that FIG. 1 depicts but an example of geographic advertising using a scalable wireless geocast protocol. The depiction of the shopping mall, the shops therein, the location of communications devices, the number of communications devices, the configuration of the geographic region, etc., depicted in FIG. 1 are exemplary and not to be construed as limiting structure or function. For example the geographic region 12 in which geographic advertising can occur is depicted by an oval. However, the geographic region can be described in terms of any appropriate geometric shape, such as a rectangle, a circle, a hexagon, an irregular shape, a curvilinear shape, or any combination thereof. The geographic region 12 can be in two or three dimensions. For example, the geographic region 12 can be a sphere or any appropriate three-dimensional shape. The geographic region can be defined in the content of communications among geocast ad hoc network members. Thus, information describing the geographic region 12 (e.g., location, size, shape, coordinates, range of coordinates, etc.) can be contained in packets communicated among the geocast ad hoc network members. The information could vary from packet to packet, vary as a function of time (e.g., geographic region changes when mall closes, or around holidays), and or predetermined and fixed prior to communications between the members of the geocast ad hoc network.

Also, it is to be understood that the depiction of a shopping mall environment is exemplary and not intended to be limiting. Other example environments can include a sporting event, a concert, a restaurant, a show, etc. Further, geographic advertising is not limited to a single geographic region. Geographic advertising can occur at multiple geographic regions. For example, a geographic advertisement could be sent to all AT&T stores in the United States.

Figure 2:
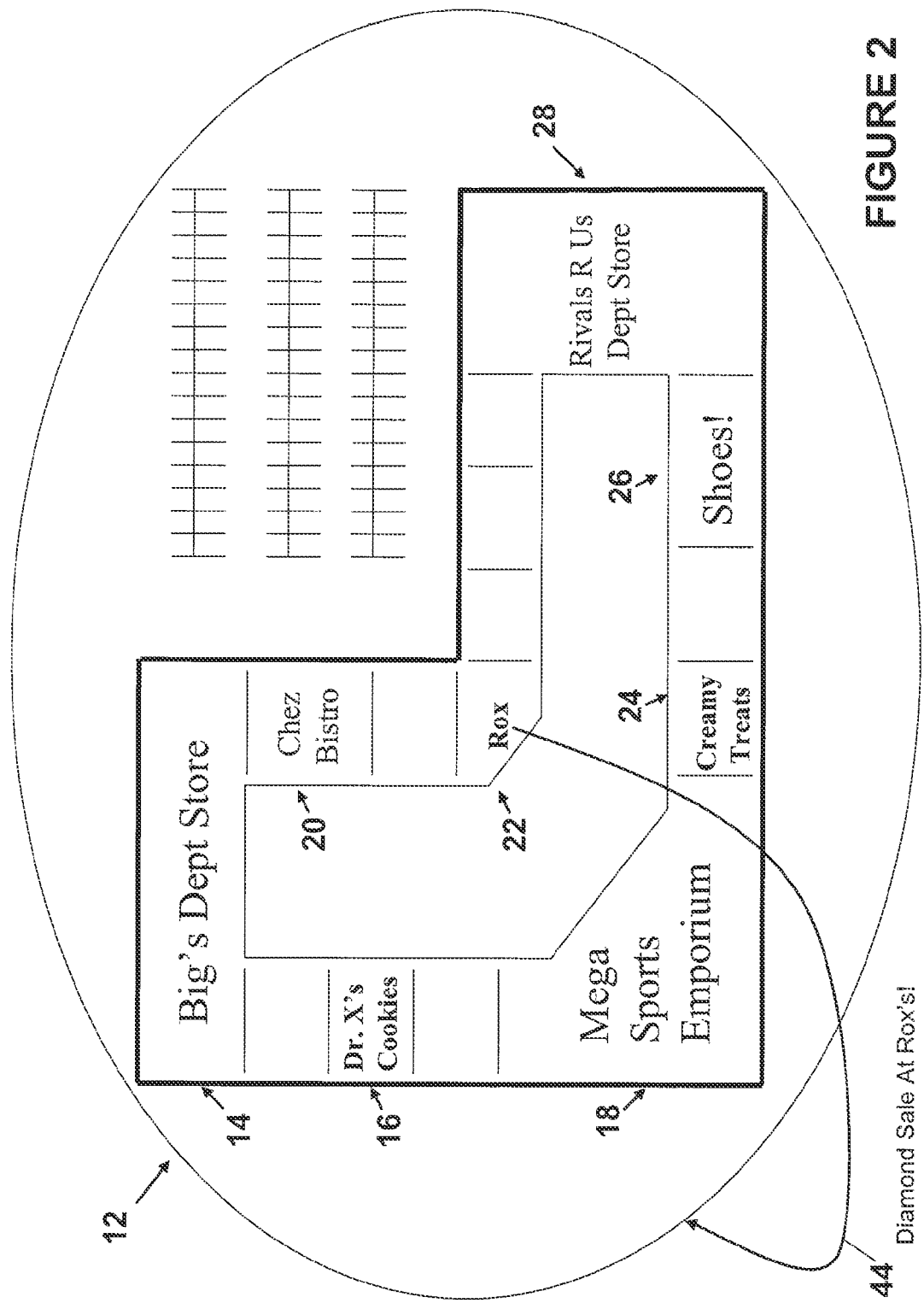
FIG. 2 is an example depiction of geographic advertising to the geographic region by a member of the geocast ad hoc network.

FIG. 2 depicts an example of geographic advertising to the geographic region 12 by a member 22 of the geocast ad hoc network. Some detail from FIG. 1 has been removed from FIG. 2 for the sake of clarity. As shown in FIG. 2, Rox's jewelry store 22 sends an advertisement, via signal 44, indicating that it is having a sale on diamonds. The advertisement can contain any appropriate information, such as the location of Rox's jewelry store 22, an image and/or video, or the like. In an example embodiment, Rox 22 transmits the advertisement periodically. As a communications device (e.g., mobile communications device) enters the geographic region 12, the mobile communications device will receive the advertisement when it is transmitted.

The signal 44 is formatted in accordance with a scalable wireless geocast protocol that includes a description of the location (e.g., coordinates) of the geographic region 12. In an example embodiment the geocast protocol also includes the location (e.g., coordinates) of the sender. The receiving communications device, upon receiving the signal 44, will compare the location of the geographic region, as provided in the signal 44 with its current location. If the locations match, that is, if the location of the receiving communications device is the same as, within, or overlaps, the location of the geographic region, the signal is further processed and the advertisement is rendered on the receiving communications device. If the locations do not match, the advertisement is not rendered.

Figure 3:
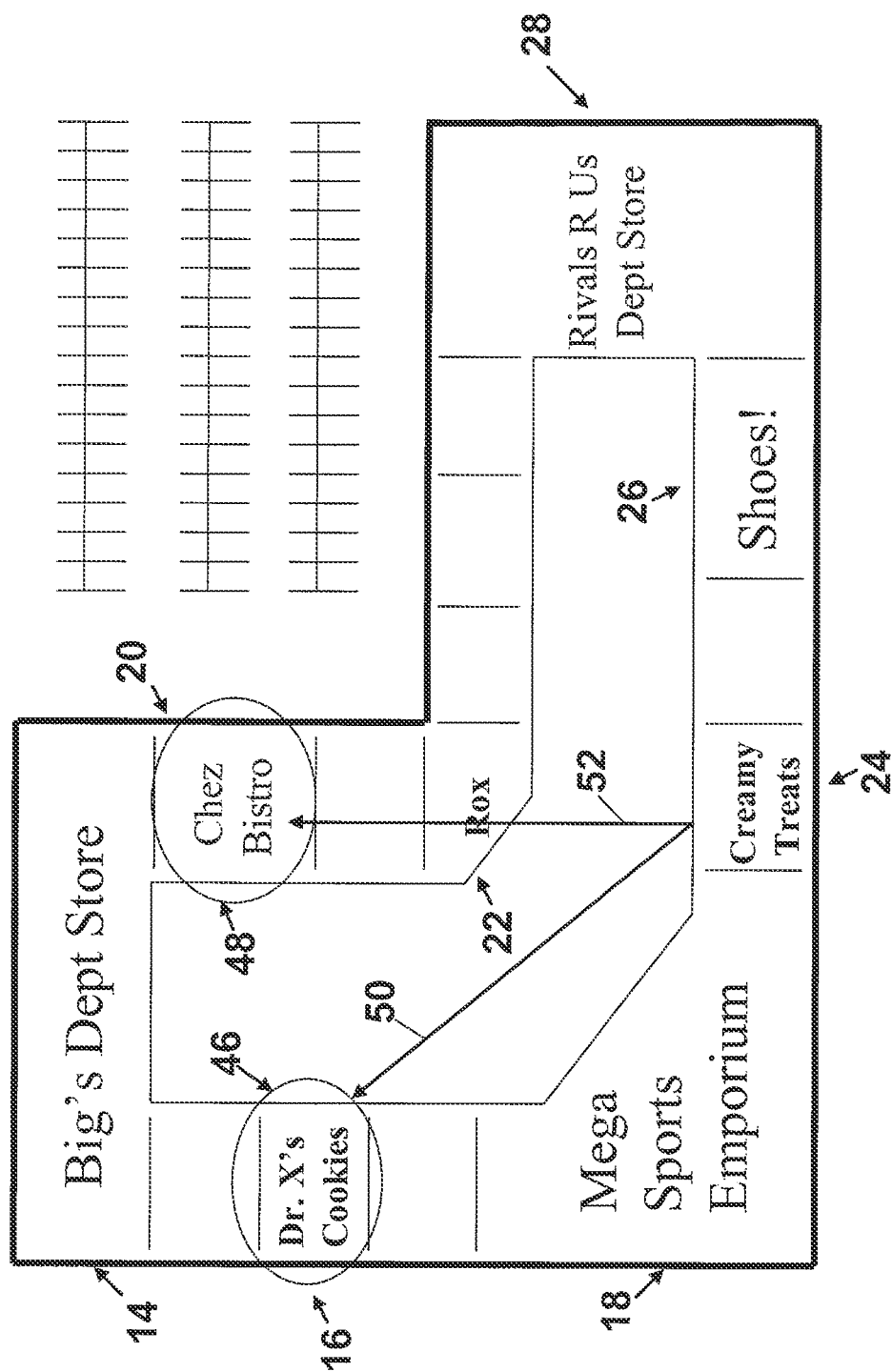
FIG. 3 is an example depiction of geographic advertising to multiple geocast regions.

FIG. 3 depicts an example of geographic advertising to multiple geocast regions. Some detail from FIG. 1 has been removed from FIG. 3 for the sake of clarity. As depicted in FIG. 3, Creamy Treats 24 is transmitting an advertisement, or the like, to geocast region 46 and to geocast region 48, via signal 50 and 52 respectively. Geocast region 46 encompasses the location of Dr. X's Cookies 16 and locations proximate to the location of Dr. X's Cookies 16. Geocast region 48 encompasses the location of Chez Bistro 20 and locations proximate to the location of Chez Bistro 20. It should be evident that the owner of Creamy Treats 24 may be motivated to send these advertisements because Dr. X's Cookies 16 may be competitor of Creamy Treats 24 and that after having a meal at Chez Bistro 20, customers may be in the mood for dessert at Creamy Treats 24. The advertisement sent via signals 50 and/or 52 could include a discount along with a message such as, "Show us your receipt from Chez Bistro and receive a 10% discount on your purchase today!" The packets describing geocast regions 20 and 46 can be in the form of two signals, one signal containing the geographic information for geocast region 20, and another signal containing the geographic information for geocast region 46; the packets describing geocast regions 20 and 46 can be in the form of one signal containing the geographic information for the union of geocast regions 20 and 26, or any combination thereof.

The signal 50 is formatted in accordance with the scalable wireless geocast protocol that includes the location (e.g., coordinates) of Creamy Treats 24 and a description of the location (e.g., coordinates) of the geographic sub-region 46. The receiving communications device, upon receiving the signal 50, will compare the location of the geographic sub-region 46, as provided in the signal 50 with its current location. If the locations match, that is, if the location of the receiving communications device is the same as, within, or overlaps, the location of the geographic sub-region 46, the signal is further processed and the advertisement is rendered on the receiving communications device. If the locations do not match, the advertisement is not rendered. Similarly, the signal 52 is formatted in accordance with the scalable wireless geocast protocol that includes the location of Creamy Treats 24 and a description of the location of the geographic sub-region 48. The receiving communications device, upon receiving the signal 52, will compare the location of the geographic sub-region 48, as provided in the signal 52 with its current location. If the locations match, that is, if the location of the receiving communications device is the same as, within, or overlaps, the location of the geographic sub-region 46, the signal is further processed and the advertisement is rendered on the receiving communications device. If the locations do not match, the advertisement is not rendered.

Figure 4:
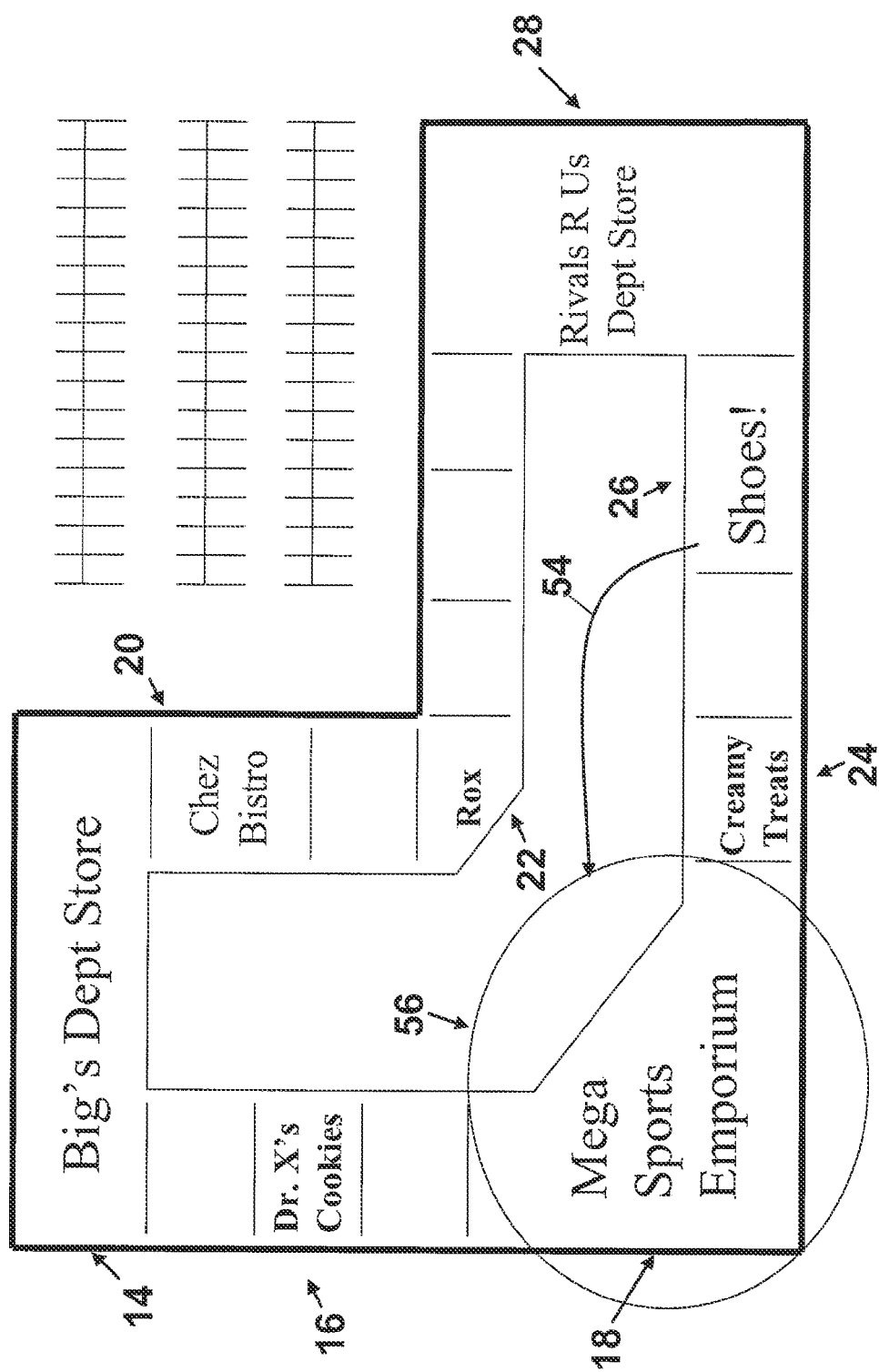
FIG. 4 is another example depiction of geographic advertising using a scalable wireless geocast protocol.

FIG. 4 depicts another example of geographic advertising. Some detail from FIG. 1 has been removed from FIG. 4 for the sake of clarity. As depicted in FIG. 4, Shoes! shoe store 26 is transmitting an advertisement, or the like, to region 56 via signal 54. Region 56 encompasses the location of Mega Sports Emporium 18. Region 56 encompasses the location of Mega Sports Emporium 18 and locations proximate to the location of Mega Sports Emporium 18. The advertisement sent via signal 54 could include an advertisement indicating that Shoes! provides a wide selection of shoes with personal service.

The signal 54 is formatted in accordance with the scalable wireless geocast protocol that includes a description of the location of the region 56. In an example embodiment the signal 54 also includes the location of Shoes! shoe store. A receiving communications device, upon receiving the signal 54, will compare the location of the region 56, as provided in the signal 54 with its current location. If the locations match, that is, if the location of the receiving communications device is the same as, within, or overlaps, the location of the region 56, the signal is further processed and the advertisement is rendered on the receiving communications device. If the locations do not match, the advertisement is not rendered.

Figure 5:
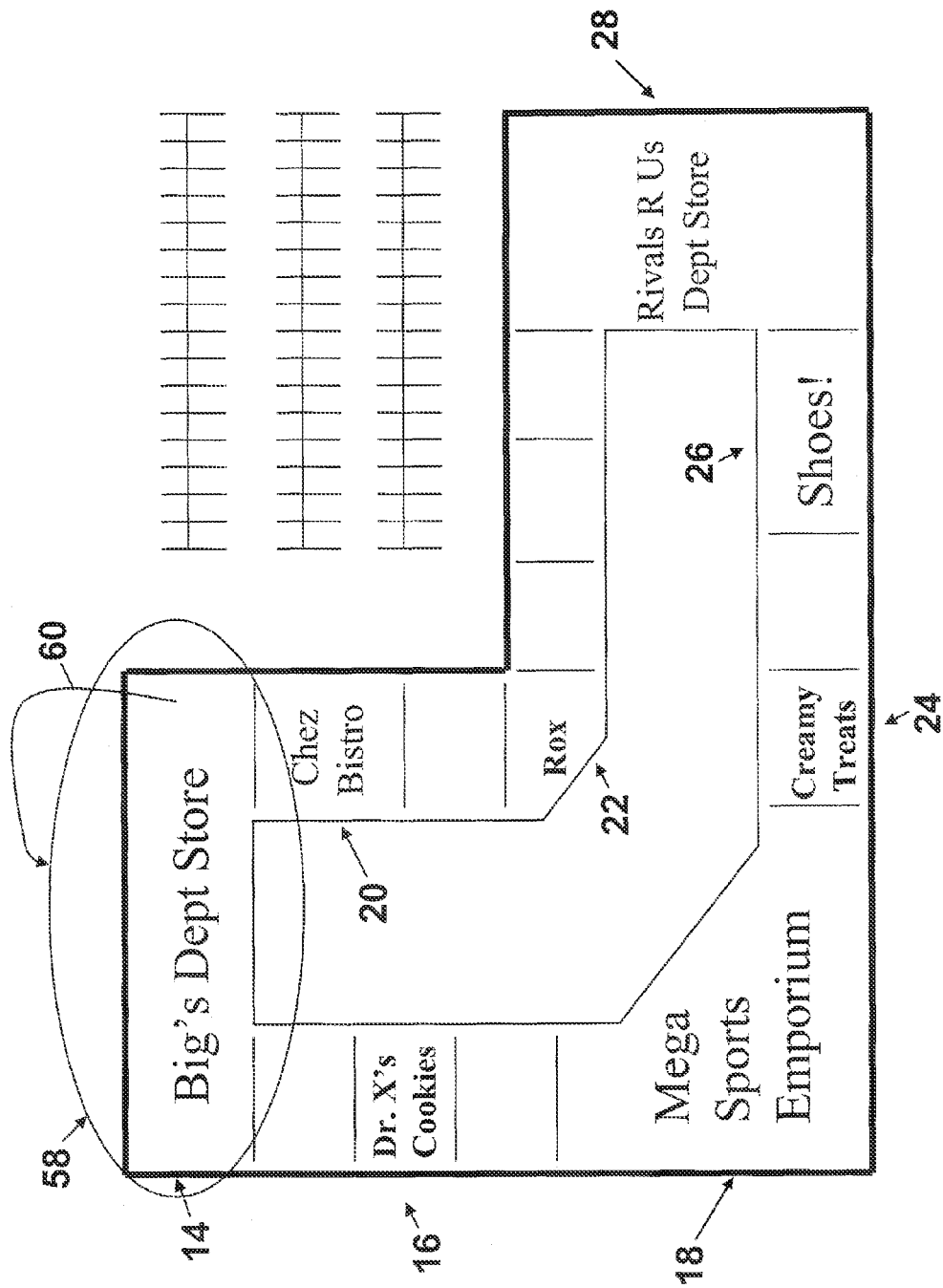
FIG. 5 is another example depiction of geographic advertising using a scalable wireless geocast protocol.

FIG. 5 depicts another example of geographic advertising. Some detail from FIG. 1 has been removed from FIG. 5 for the sake of clarity. As depicted in FIG. 5, Big's Department Store 14 is transmitting an advertisement, or the like, to region 58 via signal 60. Region 58 encompasses the location of Big's Department Store 14 and locations proximate to the location of Big's Department Store 14. The advertisement sent via signal 60 could include an advertisement indicating that there is a sale in a particular department of Big's Department Store 14. For example, the advertisement could indicate that there is a sale in the Men's Clothing department.

The signal 60 is formatted in accordance with the scalable wireless geocast protocol that includes a description of the location of the region 58. In an example embodiment, the signal 60 also includes the location of Big's Department Store 14. A receiving communications device, upon receiving the signal 60, will compare the location of the region 58, as provided in the signal 60 with its current location. If the locations match, that is, if the location of the receiving communications device is the same as, within, or overlaps, the location of the region 58, the signal is further processed and the advertisement is rendered on the receiving communications device. If the locations do not match, the advertisement is not rendered.

Location information can comprise any appropriate location information and can be described in any appropriate manner such that location information is intelligible to members of the geocast ad hoc network. For example, a location can be described in terms of latitude and longitude coordinates and/or a range of latitude and longitude coordinates, location can be described in terms of points understandable by members of the geocast ad hoc network and proximity to points, or any combination thereof.

In an example embodiment, communications devices that receive a message can resend the message in accordance with the scalable wireless geocast protocol. For example, a communication device's ability to retransmit a message can be based on the number of times the message was previously received, the communication device's proximity with respect to the communications devices from which the message was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. First, in accordance with the location-based approach, the receiving communication device determines whether it has previously received the same message at least a predetermined number (N) of times. If not, it retransmits the message over the ad hoc network of communications devices. If so, the communications device progresses to the second step and determines whether the sending communications device is closer than some minimum distance away. If no prior transmitter of the message was closer than some minimum distance away, the communications device retransmits the message over the ad hoc network of communications devices. Otherwise, the communications device progresses to the third step and determines whether it is closer to the center of the geocast region than any sending communications device from which the message was received. If so, the communications device transmits the message over the ad hoc network of communications devices. If not, the communications device does not retransmit the message.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

Figure 6:
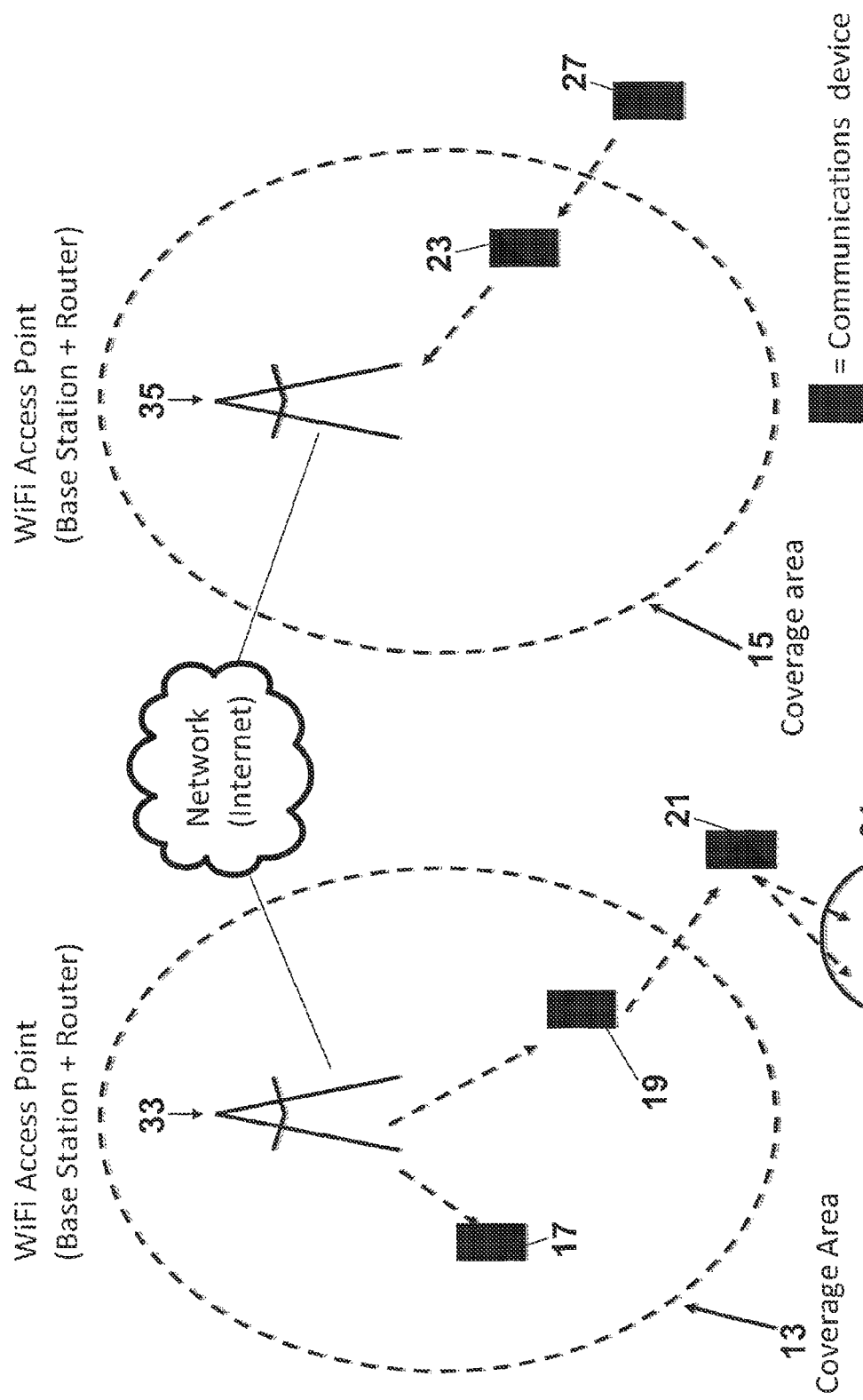
FIG. 6 illustrates communication in an ad hoc networks via a WiFi access point.

FIG. 6 illustrates communication in an ad hoc network via a WiFi access point. Communications devices in a geocast ad hoc network can communicate via RF encoded with geographic information, via Bluetooth technology, via WiFI (e.g., in accordance with the 802.11 standard), or the like, or any combination thereof. For example, as depicted in FIG. 6, communication devices 17, 19, 21, 29, and 31 form a geocast ad hoc network and communication device 23 and 27 form another geocast ad hoc network. Coverage area 13, which is the area covered by a WiFi access point 33, covers communication devices 17 and 19. Coverage area 15, which is the area covered by another WiFi access point 35 covers communication device 23. As shown in FIG. 6, communication device 27 transmits to communication device 23 directly (e.g., via Bluetooth). Communication device 23 retransmits to a WiFi access point 35 which in turn retransmits to the other WiFi access point 33. Communication devices 17 and 19 receive the transmission from the WiFi access point 33, and communication device 19 retransmits directly to communication device 21. And, as depicted, communication device 21 retransmits to other communication devices 29 and 31.

Figure 7:
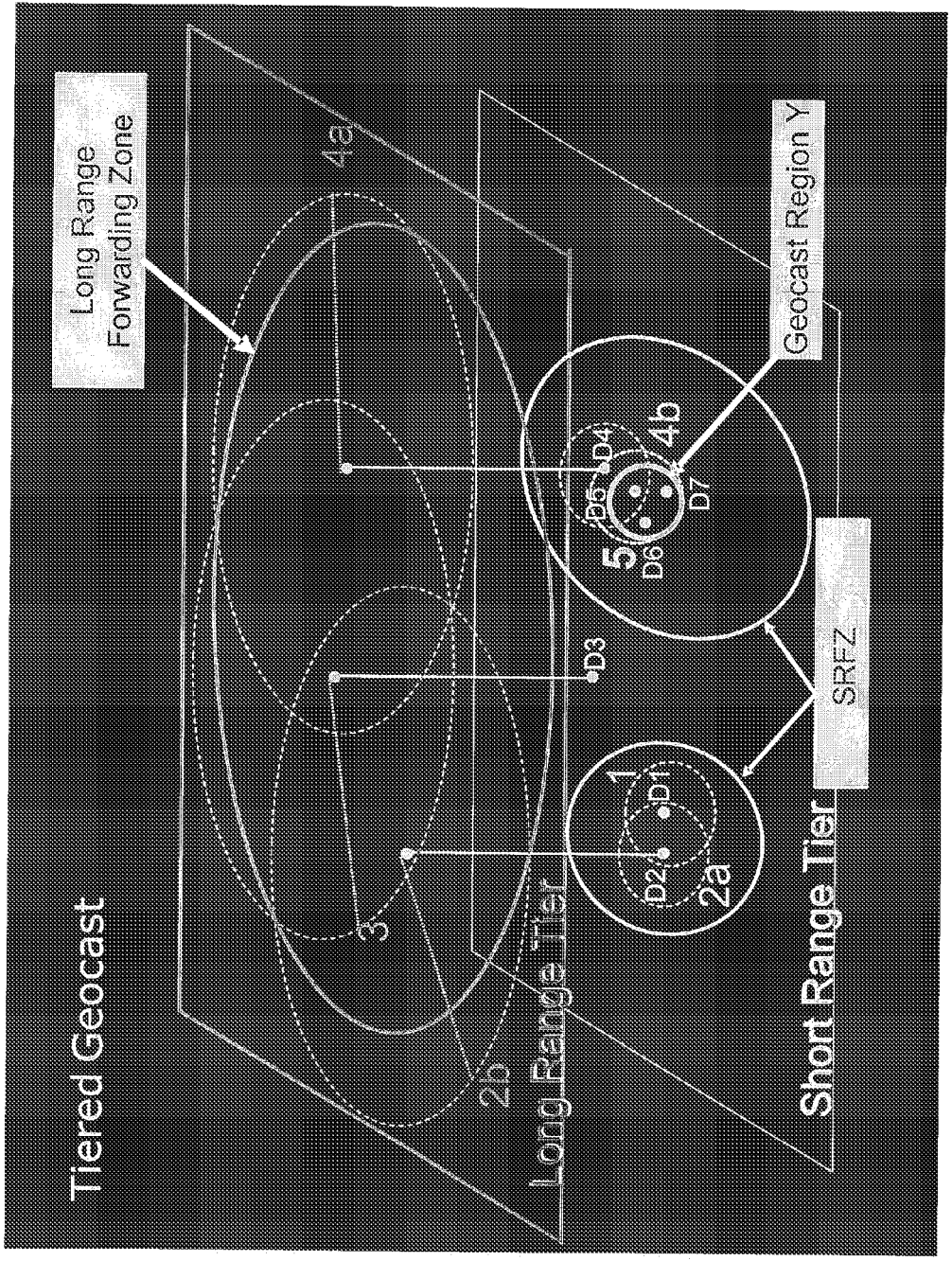
FIG. 7 illustrates tiered geocasting and forwarding zones.

FIG. 7 illustrates tiered geocasting and forwarding zones. Tiered geocasting uses long range (LR) transmitters (such as communications devices, etc.), infrastructure, a communications network, a cellular tower, or a combination thereof, when available. Tiered geocasting assumes that at least one tier is usable by at least one of the communications devices. A long range tier is a term indicating a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 7, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 7, nodes (e.g., communications devices) D1, D2, D3, D4, D5, D6, and D7, are at various locations within short range (SR) and long range (LR) tiers. All of devices D1, D2, D3, D4, D5, D6, and D7 together form a geocast ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a geocast ad hoc network. In addition, at any given time, some subset (possibly all) of the communications devices may be operable to transmit and receive packets over the long range tier network. For example, though not a limitation, in FIG. 7, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

Figure 8:
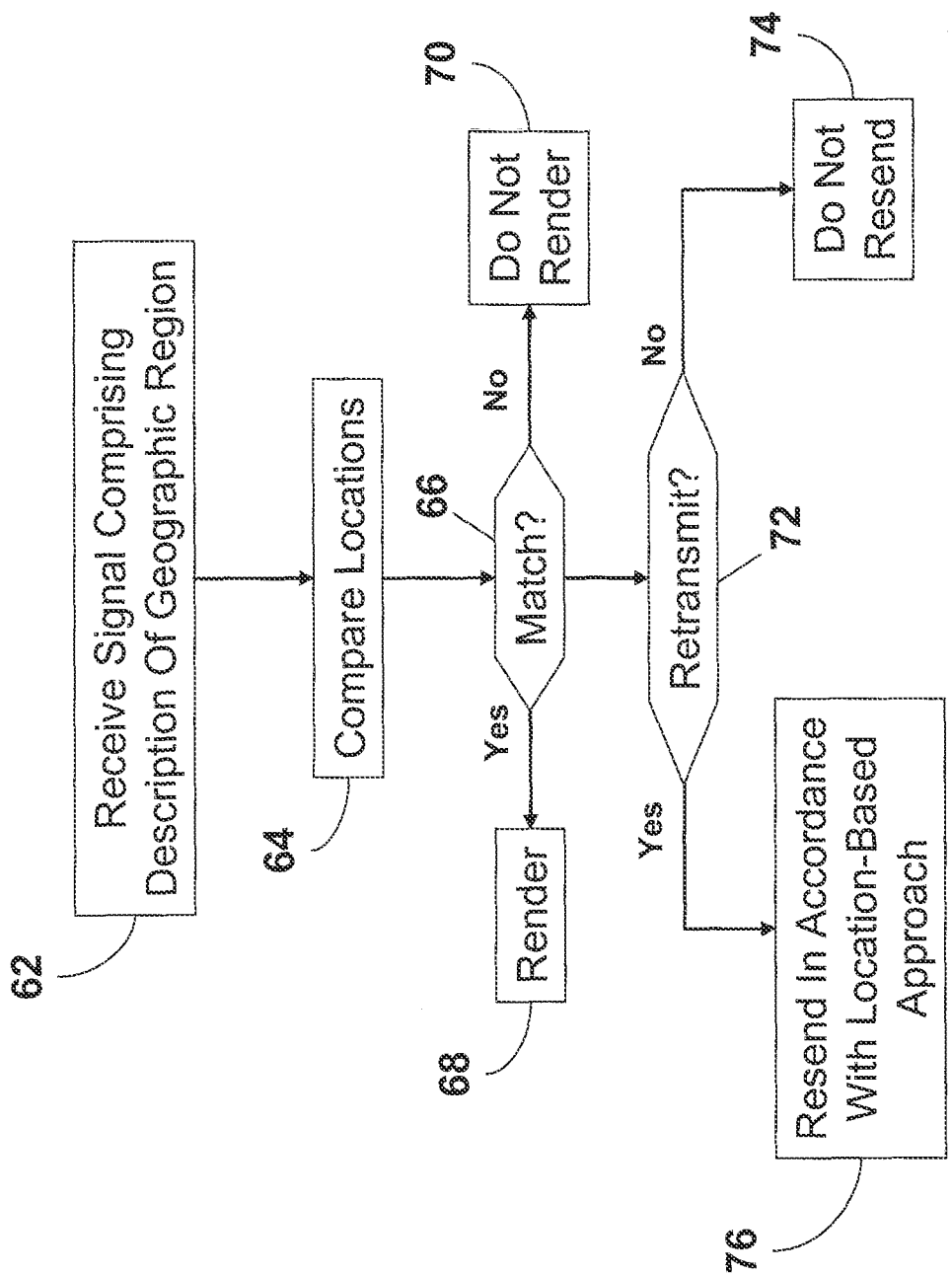
FIG. 8 is a flow diagram of an example process for communicating in an ad hoc network of communications devices in accordance with a scalable wireless geocast protocol.

FIG. 8 is a flow diagram of an example process for providing an advertisement, or the like, via geocasting. A signal is received at step 62. The signal can be received via any appropriate means. For example, the signal can be received via an 802.11 based wireless network, a cellular network, a direct transmission (not via a network), or any combination thereof. The signal comprises a description of the geographic region of intended reception of the signal. The signal can be received by any appropriate communications device, such as a mobile communications device for example. At step 64, the current location of the communication device is compared with the location of the geographic region. It is determined, at step 66 if the locations match. That is, it is determined if the location of the receiving communications device is the same as, within, or overlaps, the location of the geographic region. If the locations do not match, content of the message is not rendered at step 70. If the locations match, appropriate content (e.g., advertisement) of the message is rendered, at step 68, via the receiving communications device. At step 72, it is determined if the message is to be resent (retransmitted) by the receiving communications device. If, at step 72, it is determined that the message is not to be retransmitted, the message is not retransmitted at step 74. If, at step 72, it is determined that the message is to be retransmitted, the message is retransmitted, if appropriate, in accordance with the aforementioned approach—the location-based scalable wireless geocast protocol. In accordance with the scalable geocast protocol, the receiving communication device determines whether it has previously received the same message at least a predetermined number (N) of times. N can be any appropriate integer (e.g., 2, 5, 10, 50, 100, etc.). If not, it retransmits the message. If so, the communications device determines whether the sending communications device is closer than some minimum distance away. If no prior transmitter of the message was closer than some minimum distance away, the communications device retransmits the message. The minimum distance can be any appropriate distance (e.g., 10 meters, 100 meters, 1000 meters, 10 miles, etc.). Otherwise, the communications device determines whether it is closer to the center of the geocast region than any sending communications device from which the message was received. If so, the communications device transmits the message. If not, the communications device does not retransmit the message.

Embodiments using other decision criteria, routing schemes, and/or distributed algorithms are envisioned and intended to lie within the scope of this specification. For example, other approaches to geocasting in wireless and wired networks can be utilized such as a beaconless routing protocol, geographic random forwarding, greedy perimeter stateless routing wireless networks, or the like.

Figure 9:
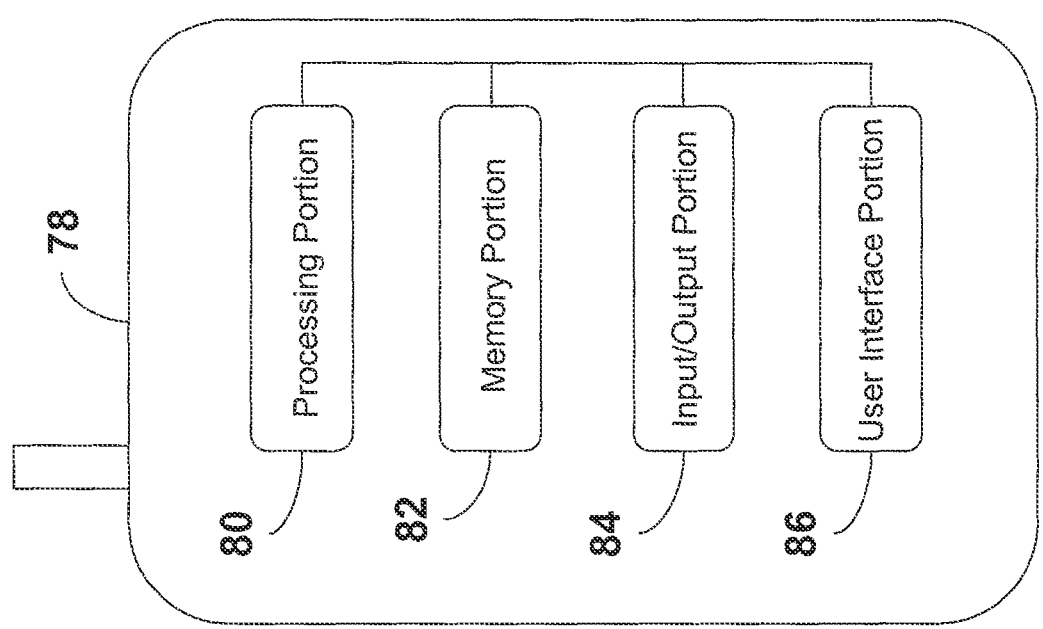
FIG. 9 is a block diagram of an example communications device configured to communicate in an ad hoc network of communications devices in accordance with a scalable wireless geocast protocol.

FIG. 9 is a block diagram of an example communications device 78 configured to communicate in an ad hoc network of communications devices in accordance with a scalable wireless geocast protocol. In an example configuration, communications device 78 is a mobile wireless device. The communications device 78 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The communications device 78 can include devices that are not typically thought of as portable, such as, for example, a public computing device, a navigation device installed in-vehicle, a set top box, or the like. The mobile communications device 78 can include non-conventional computing devices, such as, for example, a kitchen appliance, a motor vehicle control (e.g., steering wheel), etc., or the like.

The communications device 78 can include any appropriate device, mechanism, software, and/or hardware for communicate in an ad hoc network of communications devices in accordance with a scalable wireless geocast protocol as described herein. In an example embodiment, the ability to communicate in an ad hoc network of communications devices in accordance with a scalable wireless geocast protocol is a feature of the communications device 78 that can be turned on and off. Thus, an owner of the communications device 78 can opt-in or opt-out of this capability.

In an example configuration, the communications device 78 comprises a processing portion 80, a memory portion 82, an input/output portion 84, and a user interface (UI) portion 86. It is emphasized that the block diagram depiction of communications device 78 is exemplary and not intended to imply a specific implementation and/or configuration. For example, in an example configuration, the communications device 78 comprises a cellular phone and the processing portion 80 and/or the memory portion 82 are implemented, in part or in total, on a subscriber identity module (SIM) of the mobile communications device 78. In another example configuration, the communications device 78 comprises a laptop computer. The laptop computer can include a SIM, and various portions of the processing portion 80 and/or the memory portion 82 can be implemented on the SIM, on the laptop other than the SIM, or any combination thereof.

The processing portion 80, memory portion 82, and input/output portion 84 are coupled together to allow communications therebetween. In various embodiments, the input/output portion 84 comprises a receiver of the communications device 78, a transmitter of the communications device 78, or a combination thereof. The input/output portion 84 is capable of receiving and/or providing information pertaining to communicate in an ad hoc network of communications devices in accordance with a scalable wireless geocast protocol as described above. For example, the input/output portion 84 is capable of receiving and/or sending a message containing geographic information, an advertisement, a coupon, a discount, or the like, or any combination thereof, as described herein. In an example embodiment, the input/output portion 84 is capable of receiving and/or sending information to determine a location of the communications device 78. In an example configuration, the input\output portion 84 comprises a GPS receiver. In various configurations, the input/output portion 84 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 80 is capable of performing functions pertaining to communicating in an ad hoc network of communications devices in accordance with a scalable wireless geocast protocol as described above. For example, the processing portion 80 is capable of determining message content, such as location information, an advertisement, a coupon, a discount, whether it has previously received the same message at least a predetermined number of times, whether a sending communications device is closer than a minimum distance away, whether the communications device 78 is closer to the center of a geocast region than any sending communications device from which a message was received, any combination thereof, or the like, as described above. Message content can comprise text, a graphic, an image, a video, multimedia, audio, or any combination thereof. In various embodiments, the procession portion 80 is configured to determine a location of the communications device 78, a separate portion can be configured to determine location of the communication device 78, or any combination thereof.

In a basic configuration, the communications device 78 can include at least one memory portion 82. The memory portion 82 can store any information utilized in conjunction with communicating in an ad hoc network of communications devices in accordance with a scalable wireless geocast protocol as described above. For example, the memory portion 82 is capable of storing information pertaining to location of a communications device, location of a geographic region, content type, the number of times a message has previously been received, whether a sending communications device is closer than a minimum distance, whether the communications device 78 is closer to the center of a geocast region than any sending communications device from which a message was received, or a combination thereof, as described above. Depending upon the exact configuration and type of processor, the memory portion 82 can be volatile (such as some types of RAM), non-volatile (such as ROM, flash memory, etc.), or a combination thereof. The mobile communications device 78 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 78.

The communications device 78 also can contain a UI portion 86 allowing a user to communicate with the communications device 78. The UI portion 86 is capable of rendering any information utilized in conjunction with communicating in an ad hoc network of communications devices in accordance with a scalable wireless geocast protocol as described above. For example, the UI portion 86 can render an advertisement, a coupon, a message, or the like, as described above. The UI portion 86 can provide the ability to control the communications device 78, via, for example, buttons, soft keys, voice actuated controls, a touch screen, movement of the mobile communications device 78, visual cues (e.g., moving a hand in front of a camera on the mobile communications device 78), or the like. The UI portion 86 can provide visual information (e.g., via a display), audio information (e.g., via speaker), mechanically (e.g., via a vibrating mechanism), or a combination thereof. In various configurations, the UI portion 86 can comprise a display, a touch screen, a keyboard, an accelerometer, a motion detector, a speaker, a microphone, a camera, a tilt sensor, or any combination thereof. The UI portion 86 can comprise means for inputting biometric information, such as, for example, fingerprint information, retinal information, voice information, and/or facial characteristic information.

Although not necessary to implement communications in an ad hoc network of communications devices in accordance with a scalable wireless geocast protocol, communications device can be part of and/or in communications with various wireless communications networks. Some of which are described below.

FIG. 8 depicts an overall block diagram of an exemplary packet-based mobile cellular network environment, such as a GPRS network, in which communications in an ad hoc network of communications devices in accordance with a scalable wireless geocast protocol can be implemented. In the exemplary packet-based mobile cellular network environment shown in FIG. 8, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In exemplary fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

FIG. 9 illustrates an architecture of a typical GPRS network in which communications in an ad hoc network of communications devices in accordance with a scalable wireless geocast protocol can be implemented. The architecture depicted in FIG. 9 is segmented into four groups: users 950, radio access network 960, core network 970, and interconnect network 980. Users 950 comprise a plurality of end users. Note, device 912 is referred to as a mobile subscriber in the description of network shown in FIG. 9. In an example embodiment, the device depicted as mobile subscriber 912 comprises a communications device (e.g., communications device 78 12). Radio access network 960 comprises a plurality of base station subsystems such as BSSs 962, which include BTSs 964 and BSCs 966. Core network 970 comprises a host of various network elements. As illustrated in FIG. 9, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 9, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 10:
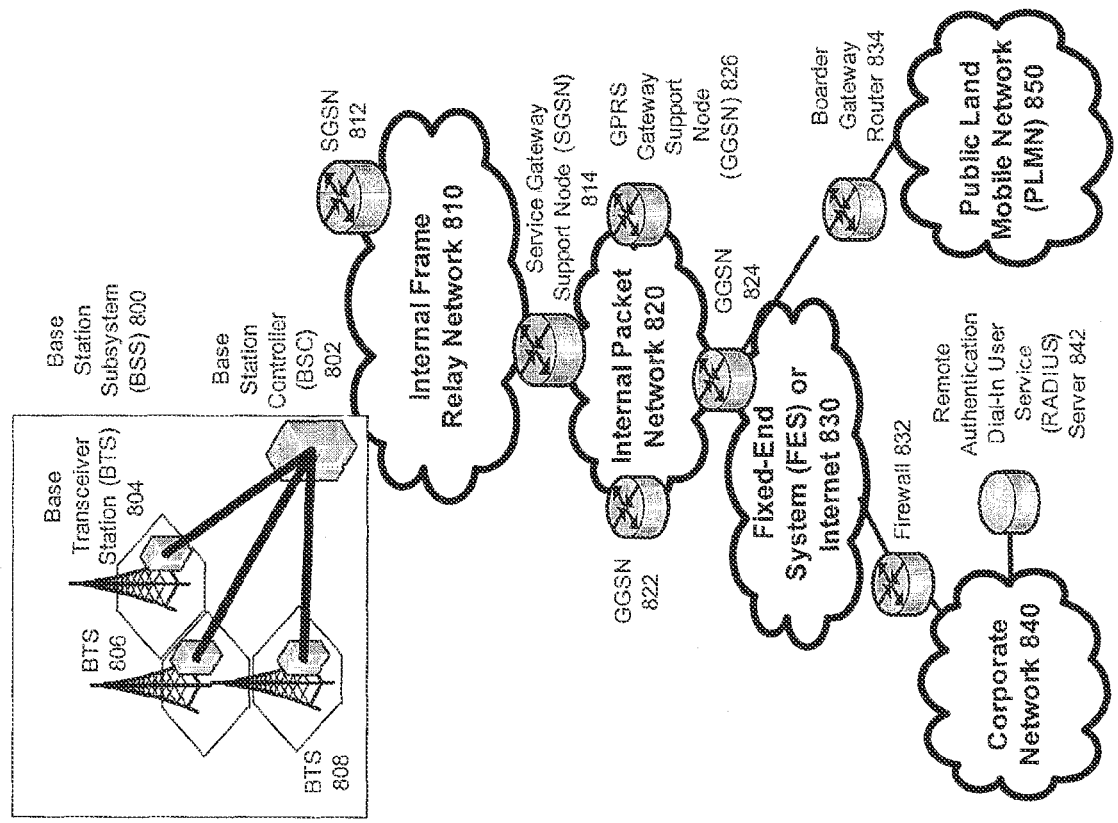
FIG. 10 depicts an overall block diagram of an exemplary packet-based mobile cellular network environment, such as a GPRS network, in which communications in an ad hoc network of communications devices in accordance with a scalable wireless geocast protocol can be implemented.
Figure 11:
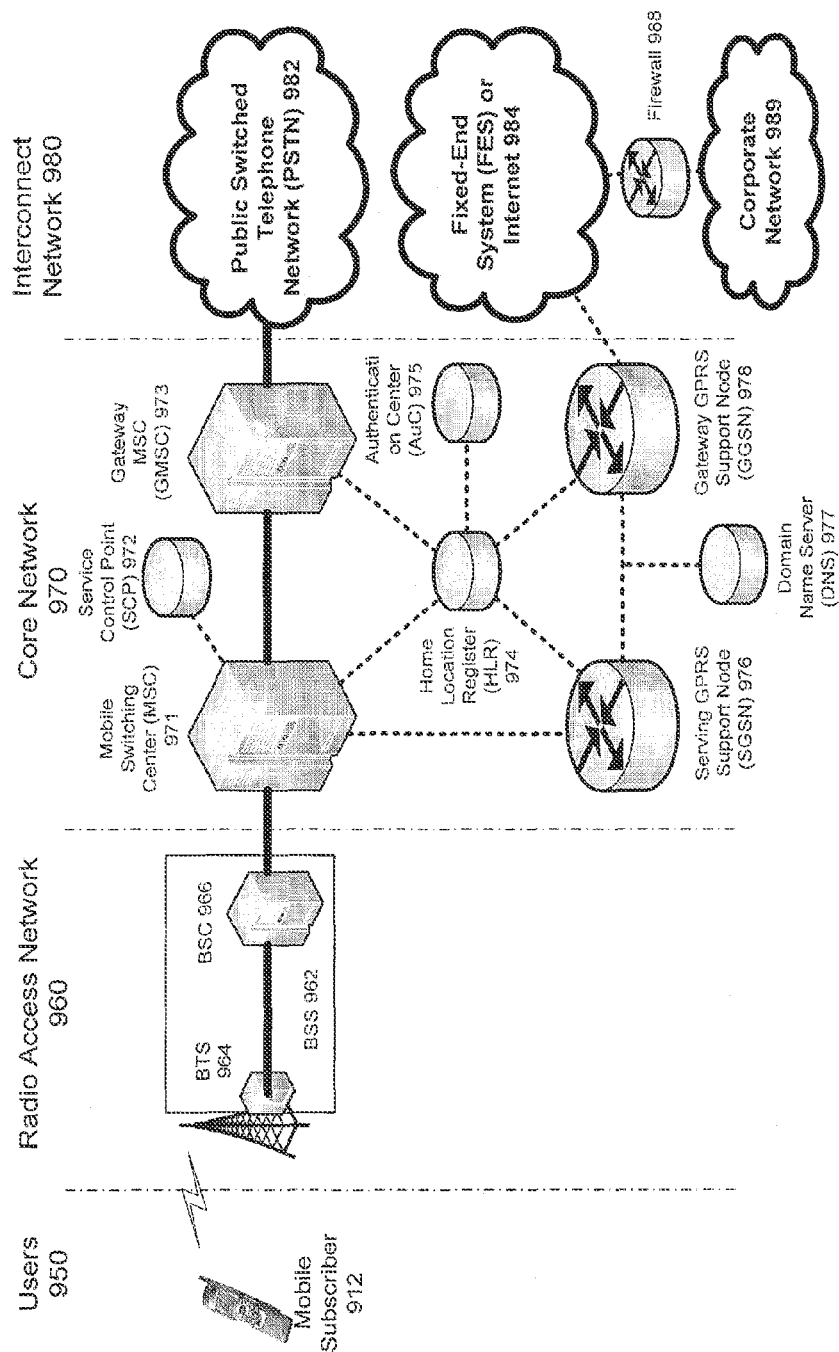
FIG. 11 illustrates an example architecture of a typical GPRS network in which communications in an ad hoc network of communications devices in accordance with a scalable wireless geocast protocol can be implemented.
Figure 12:
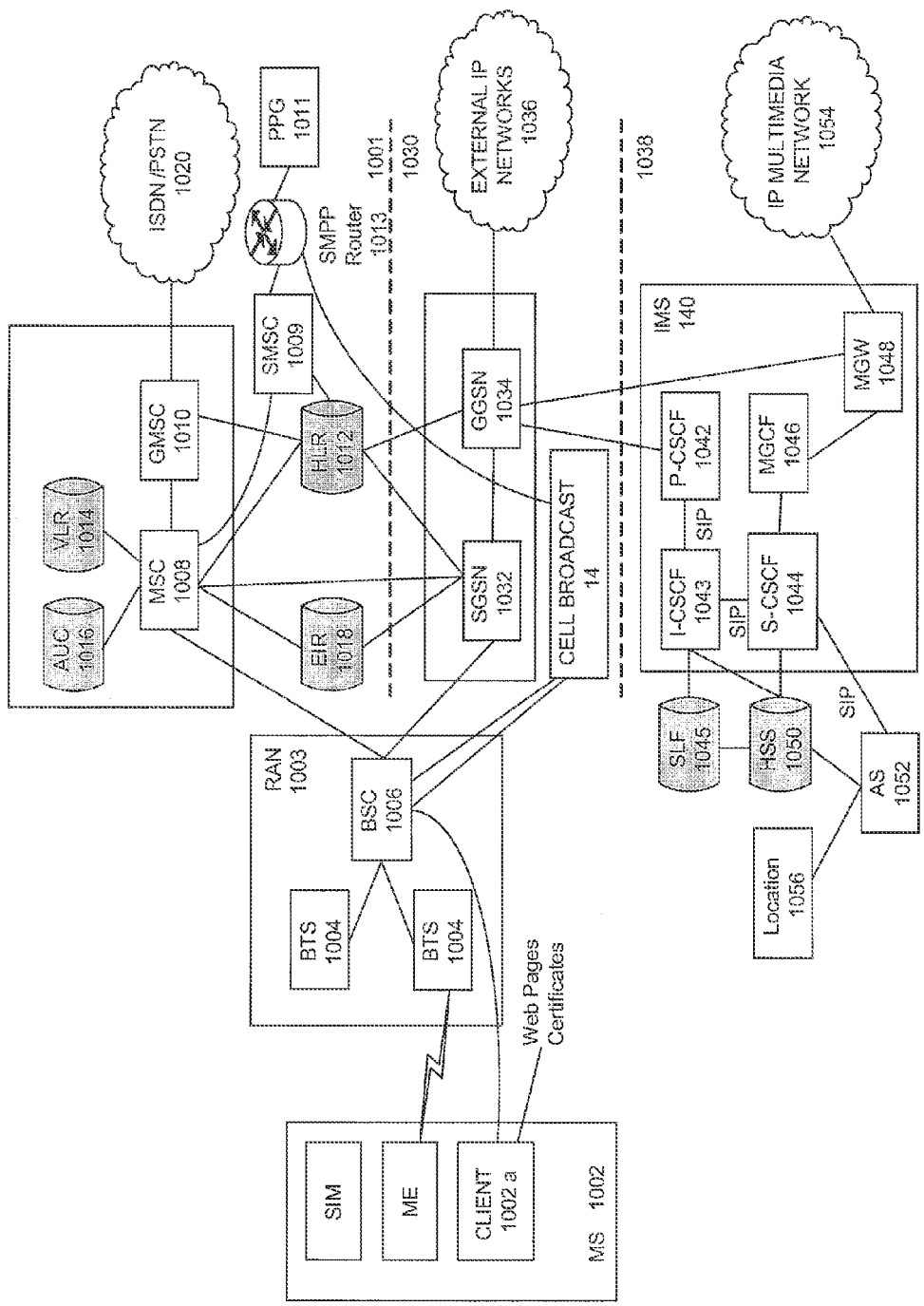
FIG. 12 illustrates an exemplary block diagram view of a GSM/GPRS/IP multimedia network architecture within which communications in an ad hoc network of communications devices in accordance with a scalable wireless geocast protocol can be implemented.

FIG. 10 illustrates an exemplary block diagram view of a GSM/GPRS/IP multimedia network architecture within which communications in an ad hoc network of communications devices in accordance with a scalable wireless geocast protocol can be implemented. As illustrated, the architecture of FIG. 10 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of communications in an ad hoc network of communications devices in accordance with a scalable wireless geocast protocol have been described in connection with various computing devices/processor, the underlying concepts can be applied to any computing device, processor, or system capable of determining propagation time. The various techniques described herein can be implemented in connection with hardware or software or, where appropriate, with a combination of both. Thus, the methods and apparatuses for communicating in an ad hoc network of communications devices in accordance with a scalable wireless geocast protocol can be implemented, or certain aspects or portions thereof, can take the form of program code (i.e., instructions) embodied in tangible storage media, such as floppy diskettes, CD-ROMs, hard drives, or any other machine-readable storage medium (computer-readable storage medium), wherein, when the program code is loaded into and executed by a machine, such as a computer, the machine becomes an apparatus for determining propagation time. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for communicating in an ad hoc network of communications devices in accordance with a scalable wireless geocast protocol also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for determining propagation time. When implemented on a general-purpose processor, the program code combines with the processor to provide a unique apparatus that operates to invoke the functionality of communicating in an ad hoc network of communications devices in accordance with a scalable wireless geocast protocol. Additionally, any storage techniques used in connection with communicating in an ad hoc network of communications devices in accordance with a scalable wireless geocast protocol can invariably be a combination of hardware and software.

While communications in an ad hoc network of communications devices in accordance with a scalable wireless geocast protocol can be implemented have been described in connection with the various embodiments of the various figures, it is to be understood that other similar embodiments can be used or modifications and additions can be made to the described embodiment for communicating in an ad hoc network of communications devices in accordance with a scalable wireless geocast protocol without deviating therefrom. For example, one skilled in the art will recognize that communicating in an ad hoc network of communications devices in accordance with a scalable wireless geocast protocol as described in the present application may apply to any environment, whether wired or wireless, and may be applied to any number of such devices connected via a communications network and interacting across the network. Therefore, communicating in an ad hoc network of communications devices in accordance with a scalable wireless geocast protocol should not be limited to any single embodiment, but rather should be construed in breadth and scope in accordance with the appended claims.

What is claimed:

1. A method for transmitting a broadcast signal from a first short range forwarding zone to a geocast region within a non-contiguous second short range forwarding zone, the method comprising:
   receiving in a first communications device operating within a long range forwarding zone and the second short range forwarding zone a broadcast signal from a second communications device;
      wherein the second communication device operates in both the long range forwarding zone and the first short range forwarding zone;
      wherein the broadcast signal was transmitted from the second communications device to the first communications device through the long range forwarding zone;
      wherein the broadcast signal comprises an indication of an advertising message and is formatted in accordance with a location-based wireless geocast protocol which comprises a packet comprising an indication of the geocast region,
   determining whether to retransmit the message from the first communication device to a third communications device within the geocast region based upon the number of times the advertising message was previously received by the first communications device, the proximity of the first communications device to the third communication device; and the proximity of the first communication device to the geocast region;
   if it is determined that the message is to be retransmitted, then retransmitting the message within the geocast region of intended reception.

2. The method of claim 1 wherein the communication device is a wireless device.

3. The method in accordance with claim 1, wherein content of the message is formulated at a time when it is sent.

4. The method in accordance with claim 1, wherein the message comprises advertising that is rendered at least one of visually, audibly, or mechanically.

5. The method in accordance with claim 4, wherein content of the rendered advertisement comprises at least one of text, a graphic, an image, multimedia, or audio.

6. The method in accordance with claim 1 wherein the broadcast signal is formatted with at least a second location based wireless geocast protocol which comprises a packed comprising an indication of at least a second geocast region.

7. A network comprising:
   a first short range forwarding zone comprising an area defined by the physical range of a first set of nodes, each of the first set of nodes capable of receiving and transmitting a broadcast signal formatted to comprise a packet having an indication of a geocast region, the broadcast signal comprising an indication of an advertisement message;
   a second short range forwarding zone that is not contiguous to the first short range forwarding zone comprising an area defined by the physical range of a second set of nodes wherein each node of the second set of nodes are capable of transmitting the broadcast signal within the second short range forwarding zone;

a geocast region within the second short range forwarding zone comprising an area defined by the physical range of a subset of the second set of nodes;

a first long range forwarding zone comprising an area defined by the physical range of at least a first node from the first set of nodes and at least a second node from the second set of nodes wherein the first node and second node have long range transmitting capability;

wherein the first node communicates with the second node within the long range forwarding zone; and the second node communicates with the subset of the second set of nodes based upon the number of times the advertising message was previously received, the wireless mobile device's proximity with respect to the communications device from which the message was sent, and/or the proximity of the communications device to the geocast region.

8. The network of claim 7 wherein the first node and the second node are long range transmitters.

9. The network of claim 7 wherein the first set of nodes and the second set of nodes comprise wireless mobile devices.

10. The network of claim 7 wherein the second node is outside the geocast region.

11. A communications device comprising:
a processor; and
memory coupled to the processor, the memory comprising executable instructions that when executed by the processor cause the processor to effectuate operations comprising:
receiving in the communications device operating within a long range forwarding zone a broadcast signal from a second communications device;
wherein the broadcast signal was transmitted from the second communications device operating in both the long range forwarding zone and a first short range forwarding zone;
wherein the broadcast signal comprises an indication of an advertising message and is formatted in accordance with a location-based wireless geocast protocol which comprises a packet comprising an indication of a geocast region inside of a second short range forwarding zone;

determining whether to retransmit the message within the geocast region based upon the number of times the advertising message was previously received and whether the first communications device is located within the second short range forwarding zone; and
if it is determined that the message is to be retransmitted, then retransmitting the message within the geocast region of intended reception.

12. The device in accordance with claim 11, wherein the communication device is a wireless device.

13. The device in accordance with claim 11, wherein content of the broadcast signal is formulated at a time when it is sent.

14. The device in accordance with claim 11, wherein content of the rendered advertisement comprises at least one of text, a graphic, an image, multimedia, or audio.

15. The device in accordance with claim 11, the operations further comprising determining whether to resend the message.

16. The device in accordance with claim 15, the operations further comprising, when it is determined to retransmit the message, retransmitting the message in accordance the location at which the broadcast signal was received.

17. The device in accordance with claim 15, wherein the geocast region comprises a retail store and locations proximate to the retail store.

18. The device in accordance with claim 15, wherein the broadcast signal is formatted with at least a second location based wireless geocast protocol which comprises a packet comprising an indication of at least a second geocast region.

19. The device in accordance with claim 15, further comprising executable instructions that when executed by the processor cause the processor to effectuate operations comprising determining whether the device is within the geocast region.

20. The device in accordance with claim 19, further comprising executable instructions that when executed by the processor cause the processor to effectuate operations comprising if the device is within the geocast region rendering the advertising on the device.

* * * * *